United States Patent [19]

Bernelin et al.

[11] Patent Number: 4,616,929
[45] Date of Patent: Oct. 14, 1986

[54] COMPACT, INTEGRAL, 6-MIRROR, TRIAXIAL, LASER RATE GYRO

[75] Inventors: Bernard Bernelin, Antony; Bernard de Salaberry, Versailles, both of France

[73] Assignee: Ste. Francaise d'Equipements pour la Navigation Aerienne, Villacoublay, France

[21] Appl. No.: 252,229

[22] Filed: Mar. 20, 1981

[30] Foreign Application Priority Data

Mar. 21, 1980 [FR] France ............................. 80 06298

[51] Int. Cl.⁴ ..................... G01C 19/64; H01S 3/101
[52] U.S. Cl. ...................................... 356/350; 372/94
[58] Field of Search ........................ 372/94, 99, 108; 356/350

[56] References Cited

U.S. PATENT DOCUMENTS

| | | | |
|---|---|---|---|
| 4,000,947 | 1/1977 | Grant | 372/94 |
| 4,155,251 | 5/1979 | Lautzenhiser | 356/350 |
| 4,247,832 | 1/1981 | Sanders et al. | 372/94 |
| 4,267,478 | 5/1981 | Ljung et al. | 356/350 |
| 4,282,495 | 8/1981 | Ljung | 356/350 |
| 4,317,089 | 2/1982 | Grat et al. | 372/94 |
| 4,392,229 | 7/1983 | Hostetler | 356/350 |
| 4,399,543 | 8/1983 | Oughstun | 356/350 |
| 4,407,583 | 10/1983 | Simms | 372/94 |
| 4,422,762 | 12/1983 | Hutchings et al. | 356/350 |

FOREIGN PATENT DOCUMENTS 1388732  1/1965  France ............................... 356/350

Primary Examiner—Nelson Moskowitz
Attorney, Agent, or Firm—Finnegan, Henderson, Farabow, Garrett & Dunner

[57] ABSTRACT

A triaxial ring laser gyroscope with three square optical paths which are planar and orthogonal with respect to one another, this laser gyroscope comprising six optical mirrors interconnected two by two by means of twelve optical path segments (capillary channels), said segments forming an octahedron, with one mirror for each corner, each of the mirrors operating simultaneously in two orthogonal optical paths.

7 Claims, 8 Drawing Figures

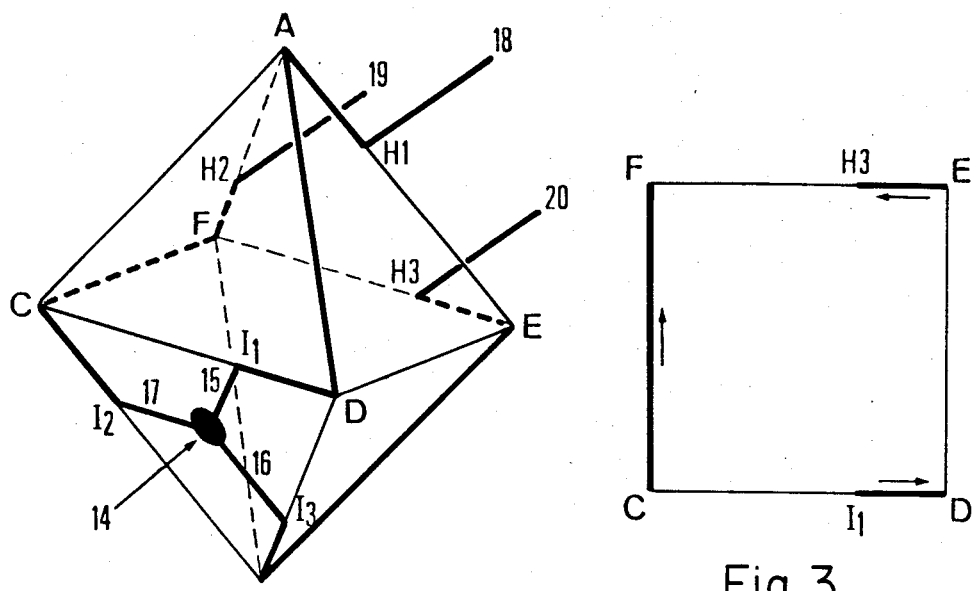
Fig. 2
Fig. 3
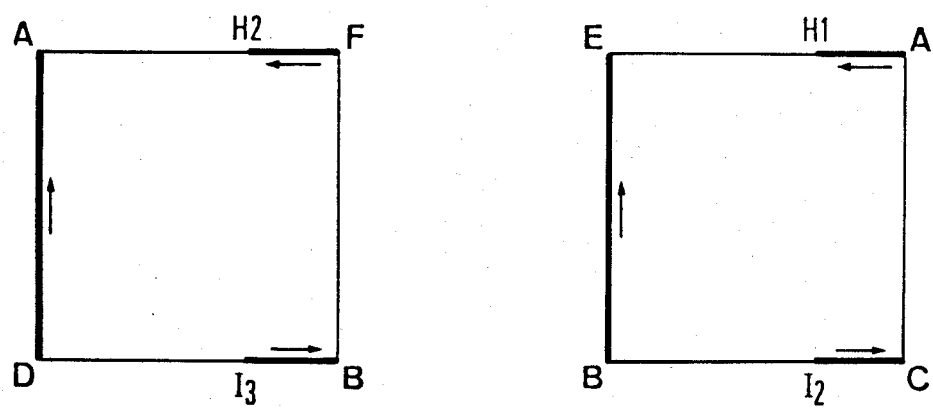
Fig. 4
Fig. 5

COMPACT, INTEGRAL, 6-MIRROR, TRIAXIAL, LASER RATE GYRO

The present invention concerns a compact, six-mirror, integral, triaxial laser rate gyro.

Single-axis, annular laser rate gyros are known, which consist of N mirrors so arranged as to define between them as many coplanar optical path segments distributed in a closed loop. The totality of these optical paths will be called perimeter or optical trajectory herein.

Most of these single detection axis laser rate gyros are three-mirror ring rate gyros with a triangular optical path. Triaxial integral rate gyros with three independent triangular perimeters comprising three mirrors per optical path, namely a total of nine mirrors, have been made.

There are also single-axis laser rate gyros with four mirrors, of which the closed optical path forms a square. One of the advantages of the four-mirror ring laser rate gyros over the three-mirror laser rate gyros is in particular less bulk for the same scale factor.

A first object of the present invention is to describe an integral, compact, laser rate gyro with six mirrors defining three optical paths or three closed, square perimeters, with mutually orthogonal, coplanar optical path segments; each of the optical paths involves only four of the six mirrors; each of the mirrors operates simultaneously on two orthogonal perimeters.

A second object of the present invention is to describe a simplified amplifying device of the above-cited three annular cavities, comprising three anodes, namely one anode per perimeter and a cathode common to the three perimeters.

Other characteristics and advantages of the present invention will make themselves apparent in relation to the description of the accompanying drawings illustrating the compact integral support with six mirrors and the amplifying device, which are provided in an illustrative and non-restrictive manner.

FIG. 1a is the view in the plane BEAC and

FIG. 1b is a view in the plane AFBD of the same mirror-prism set.

Figure 1:
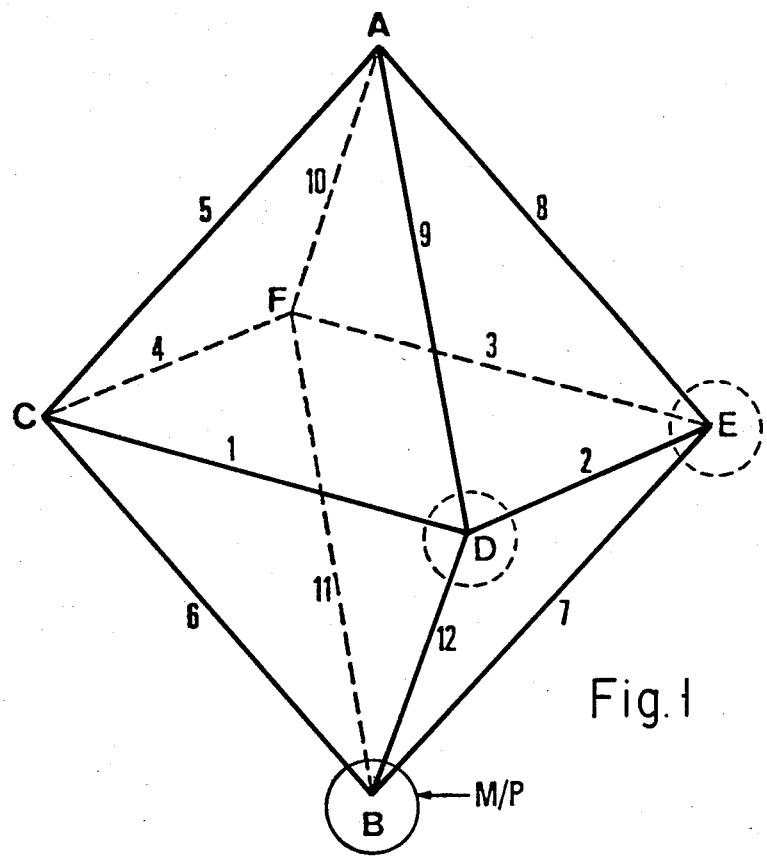
FIG. 1 is a schematic of a triaxial, six-mirror integral laser rate gyro of the invention.

For the sake of clarity in studying FIG. 1, the principle of the reflecting system (mirror) design and the optical mixer (prism) are shown only by one of the tops (corners), which is the circled top (corner) B in the embodiment being considered.

Each top comprises a reflecting device or mirror M, but only three of them include an optical mixer P, for instance tops (corners) A,C and F or B,D and E.

FIG. 2 is a schematic of an embodiment of an amplifying device, characterized in that it comprises a cathode common to three anodes and is suitable for use in a triaxial rate gyro of the invention.

FIGS. 3, 4 and 5 illustrate the distribution of the amplifying medium in each of the three orthogonal perimeters due to plasmas traveling along the ridges (edges) of the octahedron in accordance with one embodiment of the invention.

Figure 6:
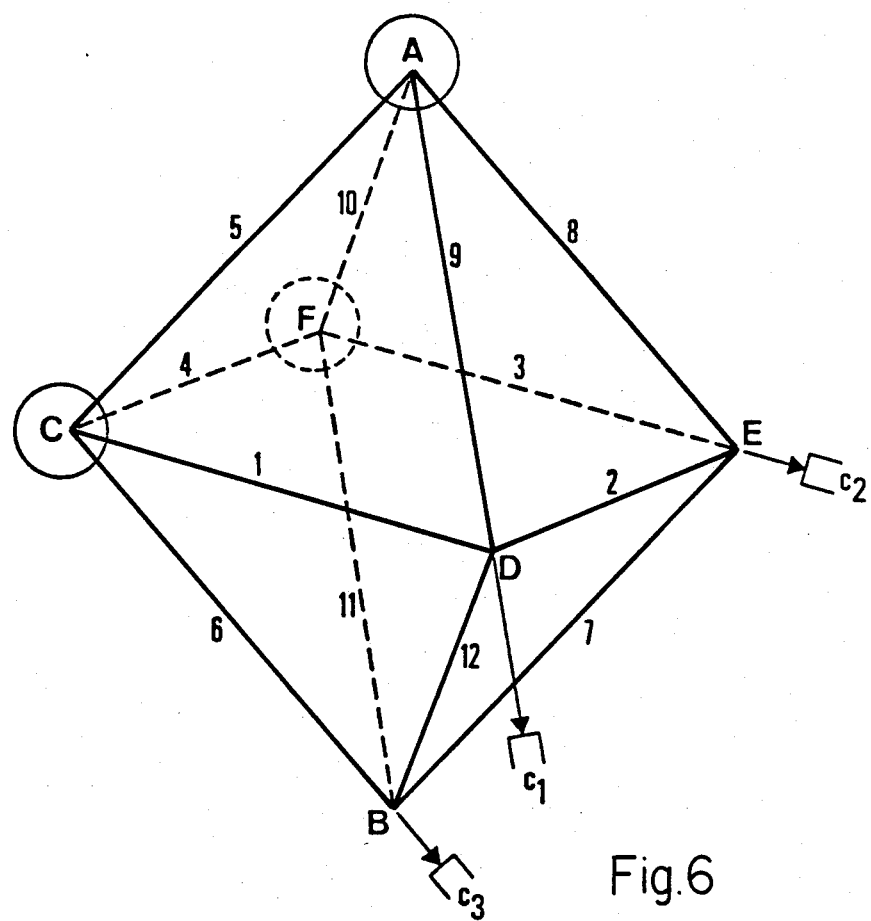

FIG. 6 is a schematic of a servomechanism for the cavity length where, for the embodiment under consideration, the mirrors emplaced at ACF move along their axes parallel to themselves by means of piezo-electric ceramics. This translation is controlled by cells $C_1$, $C_2$, $C_3$ recording the power variations in the laser beam outputs in each of the three perimeters.

FIG. 1 shows twelve capillaries or twelve optical path segments referenced 1 through 12 and linking between them six tops (corners) A,B,C,D,E, and F subtending between them a preferably regular octahedron. These twelve capillaries are drilled in an insulating block of material with a coefficient of expansion of practically zero.

The three optical paths or perimeters in this instance are substantially square mutually orthogonal quadrilaterals referenced:

C D E F, formed by the ridges (edges) 1,2,3 and 4
A C B E, formed by the ridges 5,6,7 and 8 and
A D B F, formed by the ridges 9,10,11 and 12.

The itinerary of the laser beams in these three optical paths is assured by six mirrors located at the respective corners B,C,D,E,F,A constituting the regular octahedron.

The normals to each of these optical paths (perimeters) constitute the three sensitive axes of the compact rate gyro of the invention.

The double function, or the double work of the six mirrors is summarized in the table below:

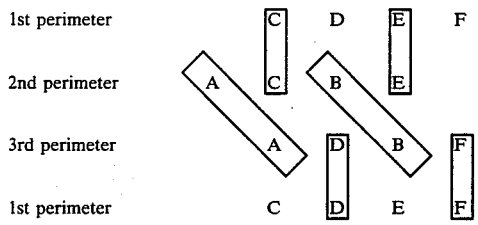

The following advantages resulting from such a design may be noted:

small bulk for a given scale factor
design simplification
overall weight reduction
possibility of using a lighter-weight (simplified) amplifier device and at the same time adaptibility and/or compatibility with known systems or devices
cavity-length servomechanism
attenuation of the linearity errors.

Presently the following will be described: amplifying devices, read-out means, and the resulting cavity-length servomechanism.

AMPLIFIER DEVICE

FIG. 2 shows the distribution of the optical paths of FIG. 1 wherein the following are shown in heavy, solid and dashed lines: three anodes 18,19 and 20, one per perimeter, and also a single cathode 14 with its three arms 15,16 and 17; said cathode is common to the three perimeters.

The cathode 14 communicates at $I_1$, $I_2$ and $I_3$ with three optical path segments (capillaries) CD, CB, BD respectively contained in the same side of the octahedron; in the example of FIG. 2, this is side CDB. Each anode 18,19 and 20 communicates respectively at $H_1$, $H_2$ and $H_3$ with one of the capillaries AE, EF and FE respectively contained in the opposite side AFE.

This geometry assures a given preferential path to the three plasmas when the following conditions apply:

(1) the diameter of the capillaries AD, CF, BE exceeds the diameter of the capillaries CD, DE, EF, AF, FB, BD, AC, CB, EA (2) the communication points $I_1$, $I_2$ and $I_3$ of the cathode with the capillaries CD, DB, BC are located in such a manner that $I_1D < I_1C$
$I_2C < I_2B$
$I_3B < I_3D$ (3) the communications points $H_1$, $H_2$, $H_3$ of the anodes with the capillaries EA, AF, FE are positioned in such a manner that $H_1A < H_1E$
$H_2F < H_2A$
$H_3E < H_3F$ where preferably
$H_1A = H_2F = H_3E = I_1D = I_2C = I_3B$
and there is identity of the diameters of the capillaries: AD-CF-BE; $H_1A$-$H_2F$-$H_3E$-$I_1D$-$I_2C$-$I_3B$.

Under these conditions, the itinerary between the cathode 14 and the three anodes 18,19 and 20 is as follows:

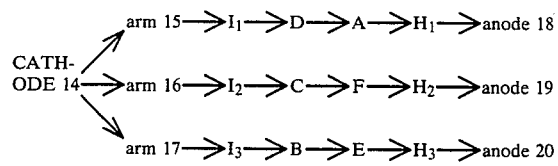

The active capillaries are shown in heavy lines in FIGS. 3, 4 and 5. The arrows indicate the direction cathode→anode. Other modes for obtaining a preferred path of lesser resistance can be used within the scope of the present invention, for instance:
the diameter of the capillaries $I_1D$, $I_2C$, $I_3B$ exceeds the diameter of the capillaries $I_1C$, $I_2B$, $I_3D$ while at the same time
the diameter of the capillaries $H_1A$, $H_2F$, $H_3E$ exceeds the diameter of the capillaries $H_1E$, $H_2A$, $H_3F$.

In that case the entry points $I_1$, $I_2$ and $I_3$ and the exit points $H_1$, $H_2$, $H_3$ possibly no longer will observe the above set conditions.

The above described geometry of the three plasmas also can be obtained by inverting the anode-cathode distribution.

READ-OUT SYSTEM

As regards the known single-axis rate gyros, a known interferometer means mixing two beams corresponding to each of the two waves of the laser rate gyro are located at the exit of a mirror in order to obtain a system of parallel interference fringes.

By moving these fringes in front of a detector, the rotation of a laser rate gyro is measured along the perpendicular to the perimeter plane.

Figure 1A:
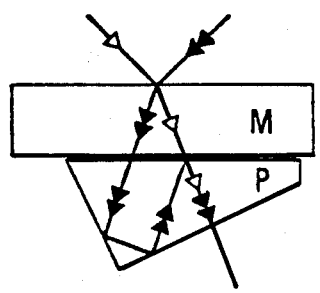
FIGS. 1a and 1b are expanded views in front and in cross-section respectively of the prism-mirror set M/P seen from the top B.
Figure 1B:
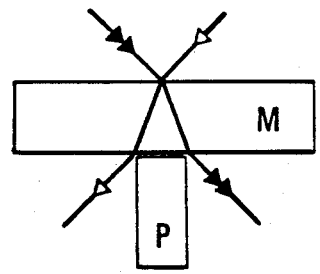

An implementation mode of the optical mixing device of the triaxial rate gyro of the invention is shown in FIGS. 1a and 1b demonstrating the double operational mode of the mirrors; one mirror controls two optical paths (optic perimeters).

Measurement of the rotation of the detection axis of one perimeter is obtained by mixing the two beams corresponding to each of the waves of this perimeter without the beams belonging to the second perimeter interfering with those of the first perimeter. Preferably this result is achieved by selecting the prism thickness in such a manner than the beams unrelated to the measurement shall not enter the optical mixing device.

The FIGS. 1a and 1b show how the same mirror reflects along two optical paths (perimeters) or two mutually orthogonal planes.

At the exit of the mirror at B, two beams rotating in the opposite direction in the perimeter BEAC (per FIG. 1a) are made to interfere; whereas the beams rotating in the inverse direction in the perimeter AFBD are expelled from the mixing system at B as shown in FIG. 1b.

As noted above, three suitably selected mirrors e.g., the mirrors at B, D and E or the mirrors at A, C, and F, each receive one mixing prism to measure the rotation of each of the three perimeters.

CAVITY-LENGTH SERVOMECHANISM

The resonance condition determining the oscillation frequency of a ring laser beam demands that the perimeter length be an integral number of wavelengths.

To be rid of the variations in length, for instance due to thermal effects, a cavity-length servomechanism is usually used. In the case of a ring laser, triangular, single-axis rate gyro, a known and frequently used means consists in imparting to one of the mirrors a translation parallel to the axis of this mirror using a piezoelectric ceramic.

As regards a six-mirror, tri-axial rate gyro object of the invention, the same solution may be implemented with the observation that one mirror controls two orthogonal perimeters.

FIG. 6 is a representative schematic of a servomechanism geometry for the cavity length of a triaxial, six-mirror laser rate gyro. In the example shown, the mirrors provided with a translating means are the mirrors of which the centers of reflection coincide with the corners A, F and C of the octahedron.

These three mirrors will be denoted by $M_A$, $M_F$, $M_C$ receive a translation motion parallel to their normal and along the axes of the octahedron at A, F and C.

The mirror $M_A$ controls the length of the perimeters AFBD and ACBE.

The mirror $M_F$ controls the length of the perimeters AFBD and FCDE.

The mirror $M_C$ controls the length of the perimeters ACBE and FCDE.

A detector or photo-electric cell oriented to measure the output power of the laser beams along each perimeter is mounted behind each of the three mirrors $M_B$, $M_D$, $M_E$.

On each perimeter, a detuning of the cavity is accompanied by a drop in the laser beam power. At each instant the mirror servoing the cavity length is displaced by a piezoelectric ceramic to tune in on the maximum power of the laser beam by a method known per se.

Each cell controls the three regulating devices, that is, at any given instant:

$E_1$ the translation for tuning in on the AFBD perimeter
$E_2$ the translation for tuning in on the ACBE perimeter
$E_3$ the translation for tuning in on the FCDE perimeter.

The data delivered by the cells act constantly on the mirror translation by means of the above cited piezoelectric ceramics.

As regards the AFBD path, the instantaneous correction is implemented by translating the mirrors $M_A$ and $M_F$ by $\frac{1}{2}E_1$ and the mirror $M_C$ by $-\frac{1}{2}E_1$.

As regards the ACBE path, the correction is implemented by translating the mirrors $M_A$ and $M_C$ by $\frac{1}{2}E_2$ and the mirror $M_F$ by $-\frac{1}{2}E_2$.

As regards the FCDE path, the correction is implemented by translating the mirrors $M_F$ and $M_C$ by $E_3/3$ and the mirror $M_A$ by $-E_3/3$.

The following applies regarding the conventional means for attenuating the linearity errors compatible with the triaxial laser rate gyro of the invention:

The well known linearization principle by scanning allows correcting the defect resulting from coupling the two laser beams rotating in the inverse direction in a perimeter. One of the known assemblies for the single-axis laser rate gyros consists in making the rate gyro oscillate about a straight line provided this straight line be not parallel to the plane defined by the perimeter, for instance about a straight line parallel to the detection axis.

As regards the triaxial six-mirror laser rate gyro of the invention, this principle is applied by making the whole block oscillate about a straight line which is not parallel to the planes defined by the three perimeters, for instance around a straight line parallel to one of the trisectors of one of the trihedrons formed by the three perimeters.

Another method consists in using the process described in the French patent #7800871 of, 1978, by making several mirrors oscillate, the axis of rotation of each mirror preferably being as close as possible to the perpendicular to the mirror considered.

In the case of the triaxial, six-mirror rate gyro of the invention, the resultant of the oscillations of the mirrors so actuated is an oscillation about a straight line which is not parallel to the planes defined by the three perimeters, for instance one of the trisectors of one of the trihedrons defined by the three perimeters.

We claim:

1. A triaxial laser gyroscope having three sensing axes and being adapted to produce simultaneously distinct measurements of angular movement around each of said axes, comprising:

(a) a solid body;
   (b) three square-shaped optical paths formed in said body and arranged mutually orthogonally with respect to each other, the geometrical axis of each of the square shapes defined by said paths corresponding to respective ones of said sensing axes; each of said paths comprising four coplanar, linearly extending capillaries arranged to form said square shapes, said paths being situated such that any two opposite corners of one square path coincide with two opposite corners of one of the other square paths, whereby said capillaries are arranged to form an octahedron having six apexes, each of said apexes corresponding to one of said respective sets of two coinciding corners; and
   (c) six optical mirrors located respectively at said six apexes, each of said mirrors intersecting the four respective capillaries forming the respective apex, and each of said mirrors being effective in two of said optical paths.

2. A triaxial laser gyroscope according to claim 1, wherein three of said six mirrors are provided with a mixing prism.

3. A triaxial laser gyroscope according to claim 2, in which the thickness of said mixing prism is adapted to permit simultaneous passage of the beam circulating in a first one of said optical paths by reflection and passage of the beam circulating in a second one of said optical paths by reflection, said second path being orthogonal to said first optical path.

4. A triaxial laser gyroscope according to claim 1, wherein three of said mirrors are provided with a mixing prism and the three remaining mirrors are each provided with a mechanical device adapted to displace said mirror along its axis parallel to itself.

5. A triaxial laser gyroscope according to claim 1, wherein said optical path segments define a regular octahedron and each optical path is a square.

6. A triaxial laser gyroscope according to claim 1, further comprising an amplifier device having three anodes and one cathode, which one anode being provided per optical path, and having a cathode common to the three optical paths.

7. A triaxial laser gyroscope according to claim 1, wherein each of said optical path segments comprises a capillary.

* * * * *